May 9, 1967 J. W. ANDERSON 3,317,946
WINDSHIELD WIPER ASSEMBLY
Filed June 30, 1964
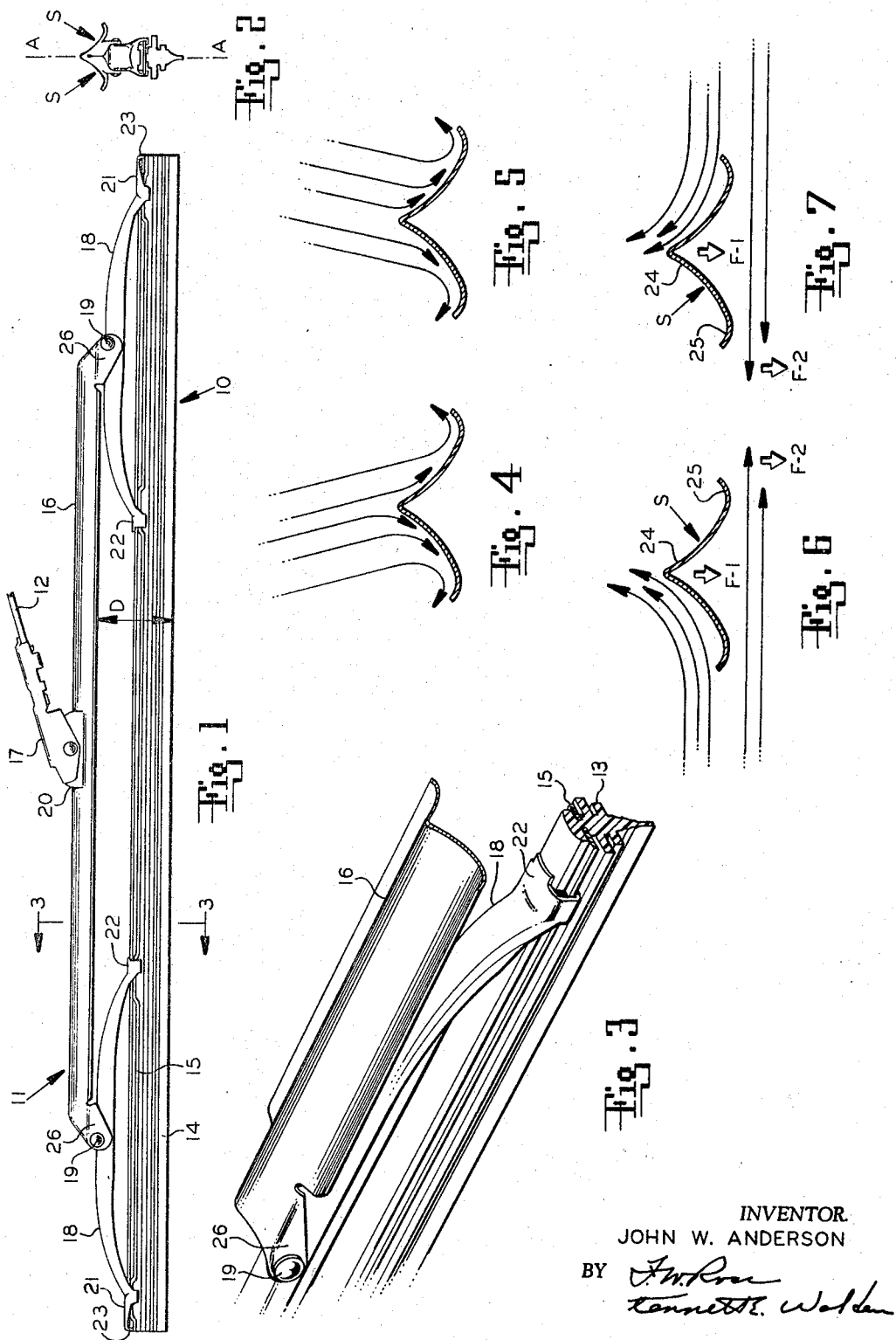
INVENTOR.
JOHN W. ANDERSON
BY
ATTORNEYS

United States Patent Office 3,317,946
Patented May 9, 1967

3,317,946
WINDSHIELD WIPER ASSEMBLY
John W. Anderson, 578 Broadway, Gary, Ind. 46402
Filed June 30, 1964, Ser. No. 379,081
8 Claims. (Cl. 15—250.42)

This invention relates to windshield wiper assemblies adapted to wipe flat and/or curved surfaces and particularly relates to windshield wiper assemblies adapted to counteract the normal tendency of such assemblies to lift from the windshield through the composite influence of natural atmospheric head winds and/or through a combination of natural head wind and wind generated by forward movement of the windshield.

On modern highways at speeds within legal limits, windshield wiper assemblies, commonly called wipers or wiper blades, frequently are lifted off the windshield during precipitations of rain, snow and the like. Such lifting of the wiper blade results in obscurement of vision by such precipitation. Recognized authorities in the field of highway safety have stated that conditions of obscurement of vision through the windshield, by rain, snow and the like, have accounted for a substantial percentage of deaths occurring from highway accidents.

It has been determined that the direction and velocity of the windstream or air flow across—or up and over—the windshield, differs substantially with differences in the shape of the windshield, cowl, hood, top, etc. Windshields, for example, of extreme curvature, found in what is termed the "wrap-around" category, can be serviced satisfactorily with what is known in the trade as an "anti-windlift" wiper blade now having wide acceptance commercially for the purpose, whereas such blades are less effective on the relatively flatter and more sloping windshields of certain now current models of widely used makes, particularly at relatively high velocities of air flow frequently encountered in highway traffic.

It would be burdensome to resellers of replacement parts to be required to predetermine which of two possible differing models would give best results on a particular windshield whereon replacement of wiper blades may be required.

Wiper assemblies embodying the present invention incorporate a novel design of airfoil member as a part of the assembly for distributing pressure from the arm to the wiper blade element. Such assemblies have proven, in repeated road tests and under varying conditions of composite wind velocity and precipitation, to provide satisfactory anti-windlift performance, on both of the above-mentioned types of windshields (wrap-around or relatively flatter) in the range of legal highway speeds under composite air velocities normally encountered at such speeds.

In accordance with the present invention, the cross-sectional configuration of the most exposed member of the pressure-distributing assembly (e.g., the primary yoke) is shaped so that portions thereof deflect upwardly air moving substantially horizontally in either direction across the windshield, as occurs when wrap-around windshields of pronounced curvature are encountered. The bilateral cross section of such a member makes wiper blades having such members equally effective regardless of the direction of approach of the air toward the blade.

The uppermost member or primary yoke of arm pressure-distributing assemblies according to the present invention, has longitudinal portions laterally and downwardly progressively spaced from its uppermost portion and has elements or portions adjacent its lower longitudinal edges shaped to divert air flowing downwardly thereon to produce additional downward pressure of such member toward the windshield, to counteract windlift.

The auxiliary members of the arm pressure-distributing assembly or secondary yokes upon which the ends of the primary yoke are pivoted, respectively, are spaced sufficiently above the wiping element of the blade assembly and above the relatively static boundary layer of air adjacent the windshield, to elevate the primary yoke and to expose its airfoil contours to the more freely moving air above said boundary layer.

It will be noted further that the design of the primary yoke illustrated herein is such as to make practicable the omission, at its extremities, of parts found desirable in anti-windlift wiper blades currently commercially accepted and widely used, wherein the cross-sectional configuration of the primary yoke presents an airfoil surface capable of deflecting only air approaching the blade from one side thereof.

Wiper blades embodying the present invention may be installed and operated successfully with either end extending upwardly. Because of the elimination of parts essential to commercially recognized present anti-windlift blades, such wipers can be manufactured at a substantial saving in cost as compared with any commercially recognized anti-windlift blade, whether for original equipment or replacement purposes.

It has been determined that, all other characteristics of the wiper blade being the same, the anti-windlift efficiency of wiper blades embodying the present invention is substantially increased as the distance between the bottom of the primary yoke and a flat surface upon which the wiper may be disposed is increased. Such increase, within practical limits, establishes the position of the bottom edge of the primary yoke in the more freely moving layer of air above the static boundary layer of air adjacent the windshield so as to subject said primary yoke to impingement by the more freely moving air.

It has been determined that wipers in which the lowermost portions of the lower edges of the primary yoke are not substantially less than an inch above a flat surface upon which the blade rests in normally operative position are commercially satisfactory when applied to present day windshields having various degrees of curvature.

It has been determined by test that, when the distance between the bottom edge of the primary yoke and the windshield, when measured as above, becomes substantially less than one inch, the efficiency of the wiper blade, as an anti-windlift blade, declines.

An object of the present invention is to provide a windshield wiper blade assembly having improved anti-windlift characteristics under a variety of conditions. It is also an object of the present invention to provide an anti-windlift wiper assembly that is efficient on cars having different external contours and different windshield curvatures and that can be installed by untrained personnel and is economical and practical to manufacture.

Other objects and advantages of the invention will become apparent after the description hereinafter set forth is considered in conjunction with the drawings annexed hereto.

In the drawings:

FIGURE 1 is a side view of windshield wiper blade assembly embodying the present invention;

FIGURE 2 is an end view of the wiper of FIGURE 1 (with the connector omitted for clarity); and FIGURE 3 is a top isometric view of one end of the wiper of FIGURE 1 taken along the line 3—3; and FIGURES 4, 5, 6, and 7 are views showing generally how air streams from various directions impinge on the primary yoke (shown in cross section).

The windshield wiper exemplified in the drawings comprises a wiper assembly or wiper blade, as the term is used commercially, comprising an elongate wiping element, blade element or squeegee indicated generally at 10 and a pressure-distributing means, assembly or superstructure, indicated generally at 11, which distributes (i.e., transmits and proportions) the pressure that it receives from wiper arm 12 to spaced locations or longitudinal points on blade element 10. Wiper blade element 10 is comformable to both flat and curved surfaces and will automatically follow the varying curvatures of surfaces, such as those encountered in wiping modern curved windshields, when urged towards the windshield by the pressure distributed by pressure-distributing means 11. Wiper blade element 10 comprises two parts, a resilient member 13, which has a wiping edge, lip or portion 14, made of rubber or other elastomeric or rubberlike material, and a flexible support member or flexor 15, made of thin springy metal. The shapes, arrangement and functions of resilient member 13 and support member 15 and the equivalency of other structures or materials are well known in the art and need not be further described for an understanding of the present invention (see, for example, U.S. Patent 2,596,063, issued May 6, 1952, to John W. Anderson). Pressure-distributing means 11 comprises a plurality of mutually articulated members including a primary pressure-distributing means, elongate member, bridge, yoke or link 16 which, in operation, receives the pressure imposed by arm 12 to which it is detachably connected, such as by connector 17. Connector 17 is pivotally connected to raised portion 20 at the mid-point of member 16. Primary yoke 16 is articulatively associated, joined or connected to secondary yokes 18 by pivots 19. The pressure imposed by arm 12 on primary member 16 is distributed and imposed on secondary or supplementary pressure-distributing means, members, yokes, or links 18, each of which in turn distribute pressure from ends 21 and 22 thereof to spaced-apart longitudinal locations, points, positions or limited areas on wiper blade element 10, as can be seen in FIGURE 1 and as set forth in U.S. Patent 2,596,063, referred to above. The ends 21 and 22 of secondary pressure-distributing members 18 are in the form of claws or equivalent structures or arrangements which transmit pressure, keep the pressure-distibuting means 11 in operative association with wiper blade element 10 and slide with respect thereto so that element 10 can freely change its effective length between ends 21 and 22 as the surface being wiped changes its curvature. Pressure-distributing means 11 is prevented from sliding off wiper blade element 10, such as by turning the outermost portions 23 of the outer ends 21 of secondary members 18 downwardly so as to engage the top of resilient member 13 in a movement-limiting relationship.

As can be seen in FIGURE 1, primary pressure-distributing means 16 is a longitudinally elongate member which serves as a pressure-distributing bridge, yoke or link between the secondary pressure-distributing members 18. Because said bridge is the uppermost member of the pressure-distributing assembly, it is the member most exposed to the more free action of various air streams. It presents a greater area to oncoming wind than the combined directly exposed areas of all other pressure-distributing members. As shown in FIGURES 2 to 7, primary member 16 has a shape or cross section having upper surfaces S which are bilaterally shaped and disposed with respect to the medial plane of the primary member and the wiper assembly (i.e., a plane passing through longitudinal axis A—A in FIGURE 2) substantially normal to the windshield. As described more fully below, surfaces S are wind-deflective.

Surfaces S have upper longitudinal portions 24 which converge upwardly toward their respective symmetrical counterparts and towards an apex. The curved upper portions 24 of the two sheetlike sides of the member 16 are concave upwardly and face outwardly from the medial plane. Portions 24 form a cusplike ridge which gives added strength to the member. Spaced laterally and downwardly away from upper portions 24 are longitudinal edge portions or elements 25. Longitudinal portions 25 are channeled, formed, turned or curved upwardly adjacent their lower linear edges. Longitudinal portions 25 are curved concavely upwardly and face inwardly toward the medial plane in a reverse sense from upper portions 24. The degree of abruptness of the curvature of both portions 24 and 25 may be varied to different requirements of differently designed windshields and automobiles.

As can be seen in FIGURES 4 and 5, air streams moving downwardly toward the top of the blade impinge upon both sides of member 16. The air stream is divided at the apex of member 16, then deflected progressively outwardly by the progressively outwardly and downwardly diverging surfaces of upper portions 24 in a direction generally parallel to the windshield and finally at least partially reversed in direction by lower portions 25 so as to exert downward force on member 16.

As can be seen in FIGURES 6 and 7, wind moving laterally from either side (i.e., wind moving substantially generally in a plane parallel with the plane of the windshield) is deflected substantially by the appropriate side of upper portion 24 so as to exert downward force indicated by arrows labeled F–1, whereby to prevent windlift. Additionally, a portion of the air stream passes below the member 16 creating, adjacent the exit side of member 16, a vacuum which exerts additional downward force indicated by the arrows labeled F–2. (The arrows shown in FIGURES 6 and 7 indicate merely in general the direction of the forces involved, it being understood that such forces may vary somewhat in direction as the composite force of the air currents generally against the windshield, and other factors, vary, all within the range that does not vary the resultant windlift effect beyond commercially practical limitations.)

It has been found that when the spacing of the lower edge of member 16 and the bottom of the blade assembly when placed or normalized on a flat surface as in FIGURE 1 (indicated by D in FIGURE 1) is a distance of about an inch, member 16 functions advantageously in a more freely moving portion or stratum of the air flowing across the windshield. As this distance is diminished and consequently member 16 approaches the boundary layer of air on the windshield, the efficiency of the wiper blade assembly as an anti-windlift device diminishes.

As shown particularly in FIGURE 3, the sides of primary member 16 are sheetlike and therefore may be rapidly and economically formed in dies from strips of metal of appropriate properties although other methods and materials of fabricating member 16 may be used. Portion 20 for attachment of pivoted connector 17 may be formed as part of the tooling operation as can be the ends of primary member 16. Portion 20 extends over such a small part of member 16 that it does not interfere with the airfoil action of member 16 which extends over substantially its entire length. Ends of primary member 16 conveniently include turned-down portions 26 which serve as supports for pivots 19. Such turned-down portions can be conveniently and economically formed from the metal strip or band used to form lower portions 25. The metal constituting an extension of upper portion 24 may be turned inwardly and downwardly so as to enclose the space below member 16 at the ends thereof.

Because member 16 is symmetrically shaped, it acts as an airfoil in either direction. The anti-windlift characteristics of such a windshield wiper are equally effective when the entire windshield wiper or blade is reversed end for end. This novel combination avoids confusion and dissatisfaction of user that can result when a user, unfamiliar with the aerodynamic properties of airfoils, incorrectly assumes that the prevailing commercial form of anti-windlift wiper blade can, under all conditions, be reversed as to the side thereof first exposed to air currents.

It is advantageous to extend the wind-deflecting surface throughout the length of the longest member of the pressure-distributing assembly to provide adequate area of such surface with a minimum of height of the member, thus avoiding objectionable side pressure on the wiper assembly and arm through longer leverage producing excessive twisting movement on the wiper arm. It is therefore desirable for the member 16 to have a low silhouette as viewed in a direction parallel to the windshield surface as compared with the width of the member 16 as viewed in a direction perpendicular to the windshield. The width of the member 16 should be greater than its height and is preferably at least twice as great.

Having thus described my invention, it is obvious that various modifications may be made in the same without departing from the spirit of the invention; and, therefore, I do not wish to be understood as limiting myself to the exact forms, constructions, arrangements and combinations of parts herein shown and described.

I claim:

1. A windshield wiper assembly comprising a wiper blade element conformable to both flat and curved surfaces and having operatively associated therewith a pressure-distributing assembly comprising a plurality of mutually articulated members adapted to distribute pressure, from a wiper arm to relatively limited spaced-apart areas on said wiper element and in a direction towards said windshield, one of said members having longitudinal portions laterally and downwardly spaced progressively away from a plane defined by the longitudinal axis of the wiper blade element and the uppermost portion of said one member, said portions having, adjacent their lower linear edges, longitudinally channeled elements whereby to turn reversingly upward, air flowing generally downwardly thereupon, whereby to increase downward pressure on the blade as the velocity of air impinging thereon increases.

2. A windshield wiper assembly comprising a wiper blade conformable to both flat and curved surfaces and having operatively associated therewith a pressure-distributing assembly comprising a plurality of mutually articulated members adapted to distribute pressure, from a wiper arm to relatively limited spaced-apart areas on said wiper blade and in a direction towards said windshield, one of said members presenting a greater area directly to oncoming currents of air than the combined directly exposed areas of all other said articulate members, said one member having substantially throughout its length longitudinal portions laterally and downwardly spaced progressively away from a vertical plane longitudinally bisecting said wiper blade and said one member, said portions having, adjacent their lower linear edges elements disposed outwardly in a horizontal direction to divert outwardly from said vertical plane the air flowing generally downwardly upon said one member, whereby to increase downward pressure on the wiper blade as the velocity of the air impinging thereon increases.

3. In a windshield wiper assembly, an elongate resilient rubberlike wiping element adapted to contact and clean a windshield, means relatively rigid laterally and supporting and propelling said element, said means being adapted to receive pressure from a windshield wiper arm and transmit said pressure to said element, said means having bilateral surfaces each at least in part generally disposed downwardly and away from a plane passing through the longitudinal axis of said wiping element and substantially normal to the windshield, upturned means adjacent the lower extremity of at least one of said downwardly disposed surfaces whereby at least a part of the air stream deflected downwardly by said downwardly disposed surface is turned generally upward and away from the windshield, whereby to increase downward pressure of the wiping element against the windshield.

4. In a windshield wiper assembly, an elongate resilient rubberlike wiping element adapted to contact and clean a windshield, means relatively rigid laterally and supporting and propelling said element, said means being adapted to receive pressure from a windshield wiper arm and transmit said pressure to said element, said means having bilateral surfaces disposed downwardly, each said surface lying away from a plane passing through the longitudinal axis of said wiping element and substantially normal to the windshield, upturned means adjacent the lower extremities of said downwardly disposed surfaces whereby at least a part of the air stream passing downwardly along said surfaces is reversely deflected generally upwardly and away from the windshield, whereby to increase downward pressure of the wiping element against the windshield.

5. A windshield wiper assembly having resistance to windlifting comprising a wiper blade element comformable to both flat and curved surfaces and means comprising a plurality of articulatively associated pressure-distributing members for distributing pressure from a wiper arm to spaced locations on said wiper element in a direction towards said windshield, one of said members having longitudinally disposed side portions lying on opposite sides of the vertical medial plane of the wiper blade element substantially normal to the windshield, said side portions being laterally and downwardly spaced progressively away from said medial plane and having adjacent their lower linear edges laterally extending portions disposed in a horizontal direction so that air flowing generally downwardly upon them is redirected away from said vertical medial plane so as to increase the downward pressure on the wiper blade element as the downward velocity of the air increases, the lowermost portions of said lower edges being not substantially less than one inch above a flat surface upon which the blade rests in normally operative position.

6. A windshield wiper assembly having resistance to windlifting comprising a wiper blade element comformable to both flat and curved surfaces and articulated means for distributing pressure from an operative wiper arm to spaced locations on said wiper element in a direction towards said windshield, said articulated means comprising a primary yoke and said wiper element in pressure-transmitting relationship, said primary yoke having two upper wind-deflecting surfaces bilaterally positioned about a plane passing through the longitudinal axis of the primary yoke and substantially normal to the windshield, said surfaces converging upwardly toward each other, said primary yoke having two lower wind-deflecting surfaces each spaced laterally outwardly and downwardly from an adjacent upper wind-deflecting surface, the outermost portions of said lower wind-deflecting surfaces diverging upwardly and outwardly from each other.

7. An anti-windlift windshield wiper assembly comprising, an elongate wiper blade element and an articulated pressure-distributing means spaced above said wiper blade element and connected thereto at spaced locations for distributing pressure to said wiper blade element from a windshield wiper arm, said articulated pressure-distributing means including an uppermost member spaced from said wiper blade element and provided with a pair of airfoil surfaces, said airfoil surfaces converging upwardly from lateral lower sides toward an apex whereby air flowing substantially from either lateral side passes above and below said member and creates downward force on said member, each of said airfoil surfaces adjacent said lower lateral side remote from said apex terminating in an upwardly curved portion whereby the direction of air currents flowing generally downward on said member is at least partially reversed so as to create downward force on said member.

8. A windshield wiper assembly having resistance to windlifting comprising a wiper blade element comformable to both flat and curved surfaces, and articulated means for distributing pressure from a wiper arm to spaced locations on said wiper blade element in a direction toward said windshield, said articulated means comprising a primary yoke adapted to receive pressure from said wiper arm, and subordinate yokes articulatively associated with said primary yoke and said wiper blade element in pressure-transmitting relationship, said primary yoke having two upwardly concavely curved surfaces bilaterally positioned about a plane passing through the longitudinal axis of the primary yoke and substantially normal to the windshield, the top of said surfaces forming an apex, said primary yoke having two lower surfaces each spaced laterally outwardly and downwardly from an adjacent upper surface, the outermost portions of said lower surfaces curving upwardly and outwardly from each other.

References Cited by the Examiner

UNITED STATES PATENTS

| | | | |
|---|---|---|---|
| 2,751,619 | 6/1956 | Chambers | 15—250.42 |
| 2,792,586 | 5/1957 | Chambers | 15—250.42 |
| 3,006,017 | 10/1961 | Krohm et al. | 15—250.37 |
| 3,082,464 | 3/1963 | Smithers | 15—250.42 |
| 3,128,491 | 4/1964 | Reese | 15—250.42 |

CHARLES A. WILLMUTH, *Primary Examiner.*